(12) United States Patent
Chen et al.

(10) Patent No.: US 9,471,368 B2
(45) Date of Patent: *Oct. 18, 2016

(54) SHARING RESOURCES ALLOCATED TO AN ENTITLED VIRTUAL MACHINE

(71) Applicant: International Business Machines Corporation, Armonk, NY (US)

(72) Inventors: Wen-Tzer T. Chen, Austin, TX (US); Diane G. Flemming, Pflugerville, TX (US); William A. Maron, Austin, TX (US); Bruce G. Mealey, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/019,008

(22) Filed: Feb. 9, 2016

(65) Prior Publication Data
US 2016/0154671 A1 Jun. 2, 2016

Related U.S. Application Data

(63) Continuation of application No. 13/974,212, filed on Aug. 23, 2013.

(51) Int. Cl.
*G06F 12/00* (2006.01)
*G06F 9/455* (2006.01)
*G06F 9/50* (2006.01)
*G06F 9/48* (2006.01)

(52) U.S. Cl.
CPC ......... *G06F 9/45558* (2013.01); *G06F 9/4812* (2013.01); *G06F 9/5005* (2013.01); *G06F 9/5077* (2013.01); *G06F 2009/4557* (2013.01); *G06F 2009/45579* (2013.01)

(58) Field of Classification Search
CPC ............... G06F 9/45558; G06F 2009/4557; G06F 9/4812; G06F 9/5005
See application file for complete search history.

(56) References Cited

U.S. PATENT DOCUMENTS

| 7,290,260 | B2 | 10/2007 | Miller |
| 8,024,738 | B2 | 9/2011 | Flemming et al. |
| 8,146,091 | B2 | 3/2012 | Johnson et al. |
| 2004/0003077 | A1 | 1/2004 | Bantz et al. |
| 2008/0307425 | A1 | 12/2008 | Tripathi et al. |
| 2009/0217283 | A1 | 8/2009 | Anand et al. |
| 2009/0307439 | A1 | 12/2009 | Jacobs et al. |
| 2011/0154322 | A1 | 6/2011 | Nayar et al. |
| 2011/0191477 | A1 | 8/2011 | Zhang et al. |

OTHER PUBLICATIONS

U.S. Appl. No. 13/974,212.
U.S. Appl. No. 14/028,858.
U.S. Appl. No. 15/019,016.

*Primary Examiner* — Larry Mackall
(74) *Attorney, Agent, or Firm* — Francis Lammes; Stephen J. Walder, Jr.; Thomas E. Tyson

(57) ABSTRACT

A mechanism is provided for sharing resources allocated to an entitled virtual machine (VM). A blocked domain is created around the entitled VM and one or more processors allocated to the entitled VM. A first dispatching algorithm is implemented that prevents the dispatching of processes from other operating systems within other VMs to the one or more processors allocated to the entitled VM. Responsive to utilization of the one or more processors allocated to the entitled VM falling below a predetermined threshold, a second dispatching algorithm is implemented that allows dispatching of processes from the other operating systems within the other VMs to the one or more processors allocated to the entitled VM.

8 Claims, 5 Drawing Sheets

SHARING RESOURCES ALLOCATED TO AN ENTITLED VIRTUAL MACHINE

BACKGROUND

The present application relates generally to an improved data processing apparatus and method and more specifically to mechanisms for sharing resources allocated to an entitled virtual machine.

A virtual machine (VM) is a software implemented abstraction of underlying hardware, which is presented to an application layer of a data processing system. A virtual machine, which may also be referred to as a logical partition (LPAR) may be based on specifications of a hypothetical computer or emulate a computer architecture and functions of a real world computer. Thus, a virtual machine (VM) is a software implementation of a machine i.e. a computer) that executes programs like a physical machine. Virtual machines are separated into two major classifications, based on their use and degree of correspondence to any real machine:
1. A system virtual machine provides a complete system platform which supports the execution of a complete operating system (OS). A system virtual machine usually emulates an existing architecture, and is built with the purpose of either providing a platform to run programs where the real hardware is not available for use (for example, executing software on otherwise obsolete platforms), or of having multiple instances of virtual machines lead to more efficient use of computing resources, both in terms of energy consumption and cost effectiveness (known as hardware virtualization, the key to a cloud computing environment), or both.
2. A process virtual machine (also, language virtual machine) is designed to run a single program, which means that it supports a single process. Such virtual machines are usually closely suited to one or more programming languages and built with the purpose of providing program portability and flexibility (amongst other things).

An essential characteristic of virtual machines is that the software running inside the virtual machine is limited to the resources and abstractions allocated to the virtual machine, i.e. the virtual machine cannot break out of its virtual environment.

There are two main aspects of virtual environments: VM placement and shared processor VMs. VM placement is of fundamental importance because of the well-known fact that when all processors allocated to the VM are contained within a same node as the VM, the performance of that VM is maximized. All local processors mean more effective cache algorithms, better data sharing, lower latencies, and the opportunity to effectively manage the VM's data in a single, local memory region. This configuration is called a Home Node.

Shared processor VMs improve the efficiency of processors in a system by allowing unused processor cycles from one VM to be claimed and used by other VMs. Dedicated processor cycles are often wasted if the process running on them goes idle. Sharing of processors cycles ensures that the processor utilization is maximized. However, one drawback of a shared processor environment is that, when the original process is ready to begin using its allocated processor cycles, the processor cycles might be allocated to a foreign, uncapped VM who saw an opportunity to grab the extra processor cycles. Therefore, the process might then be forced to use shared processors, which could create longer latencies, more cache traffic across nodes, etc.

SUMMARY

In one illustrative embodiment, a method, in a data processing system, is provided for sharing resources allocated to an entitled virtual machine (VM). The illustrative embodiment creates a blocked domain around the entitled VM and one or more processors allocated to the entitled VM. The illustrative embodiment implements a first dispatching algorithm that prevents the dispatching of processes from other operating systems within other VMs to the one or more processors allocated to the entitled VM. The illustrative embodiment implements a second dispatching algorithm that allows dispatching of processes from the other operating systems within the other VMs to the one or more processors allocated to the entitled VM in response to utilization of the one or more processors allocated to the entitled VM below a predetermined threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments are directed to mechanisms for sharing resources allocated to an entitled virtual machine (VM). That is, the illustrative embodiments provide a mechanism that ensures that an entitled VM's optimized placement is preserved and the processor cycles are reserved for the entitled VM's use, while still making unused processor cycles available to uncapped VMs (remote or local) when the processor cycles are needed. By giving performance-sensitive VMs priority in a local processor pool of a shared VM environment (i.e., creating an entitled VM), processor cycles allocated to the entitled VM are made available to uncapped VMs under certain circumstances.

Figure 1:
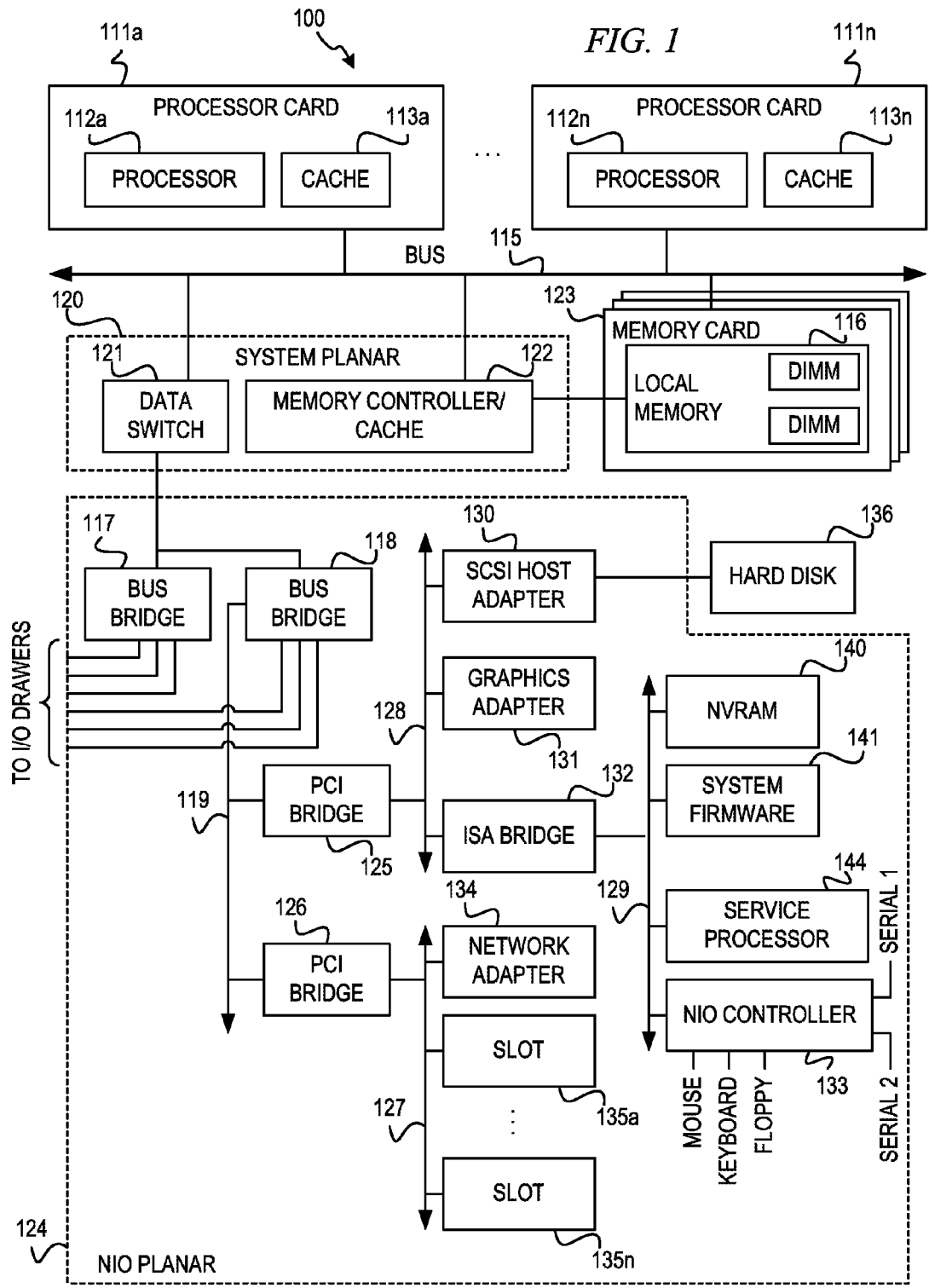
FIG. 1 depicts a block diagram of a data processing system with which aspects of the illustrative embodiments may advantageously be utilized.
Figure 2:
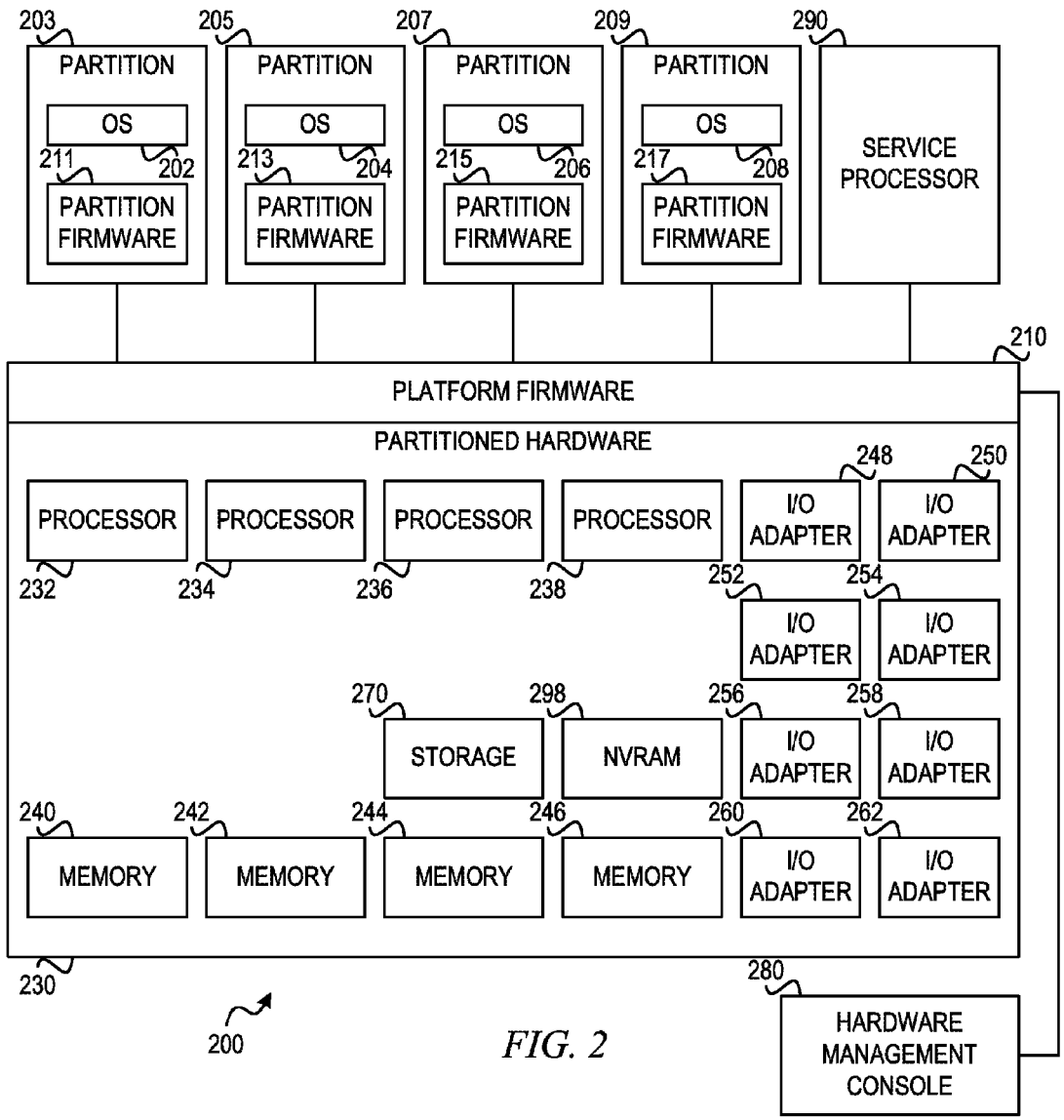
FIG. 2 is a block diagram of an exemplary logical partitioned platform in which exemplary aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a block diagram of a data processing system with which aspects of the illustrative embodiments may advantageously be utilized. As shown, data processing system 100 includes processor cards 111a-111n. Each of processor cards 111a-111n includes a processor and a cache memory. For example, processor card 111a contains processor 112a and cache memory 113a, and processor card 111n contains processor 112n and cache memory 113n.

Processor cards 111a-111n are connected to main bus 115. Main bus 115 supports a system planar 120 that contains processor cards 111a-111n and memory cards 123. The system planar also contains data switch 121 and memory controller/cache 122. Memory controller/cache 122 supports memory cards 123 that include local memory 116 having multiple dual in-line memory modules (DIMMs).

Data switch 121 connects to bus bridge 117 and bus bridge 118 located within a native I/O (NIO) planar 124. As shown, bus bridge 118 connects to peripheral components interconnect (PCI) bridges 125 and 126 via system bus 119. PCI bridge 125 connects to a variety of I/O devices via PCI bus 128. As shown, hard disk 136 may be connected to PCI bus 128 via small computer system interface (SCSI) host adapter 130. A graphics adapter 131 may be directly or indirectly connected to PCI bus 128. PCI bridge 126 provides connections for external data streams through network adapter 134 and adapter card slots 135a-135n via PCI bus 127.

An industry standard architecture (ISA) bus 129 connects to PCI bus 128 via ISA bridge 132. ISA bridge 132 provides interconnection capabilities through NIO controller 133 having serial connections Serial 1 and Serial 2. A floppy drive connection, keyboard connection, and mouse connection are provided by NIO controller 133 to allow data processing system 100 to accept data input from a user via a corresponding input device. In addition, non-volatile RAM (NVRAM) 140 provides a non-volatile memory for preserving certain types of data from system disruptions or system failures, such as power supply problems. A system firmware 141 is also connected to ISA bus 129 for implementing the initial Basic Input/Output System (BIOS) functions. A service processor 144 connects to ISA bus 129 to provide functionality for system diagnostics or system servicing.

The operating system (OS) is stored on hard disk 136, which may also provide storage for additional application software for execution by data processing system. NVRAM 140 is used to store system variables and error information for field replaceable unit (FRU) isolation, During system startup, the bootstrap program loads the operating system and initiates execution of the operating system. To load the operating system, the bootstrap program first locates an operating system kernel One from hard disk 136, loads the OS into memory, and jumps to an initial address provided by the operating system kernel. Typically, the operating system is loaded into random-access memory (RAM) within the data processing system. One loaded and initialized, the operating system controls the execution of programs and may provide services such as resource allocation, scheduling, input/output control, and data management.

The illustrative embodiment may be embodied in a variety of data processing systems utilizing a number of different hardware configurations and software such as bootstrap programs and operating systems. The data processing system 100 may be, for example, a stand-alone system or part of a network such as a local-area network (LAN) or a wide-area network (WAN).

FIG. 2 is a block diagram of an exemplary logical partitioned platform in which exemplary aspects of the illustrative embodiments may be implemented. The hardware in logical partitioned platform 200 may be implemented as, for example, data processing system 100 in FIG. 1. Logical partitioned platform 200 includes partitioned hardware 230, operating systems 202, 204, 206, 208, and firmware 210. Operating systems 202, 204, 206, and 208 may be multiple copies of a single operating system or multiple heterogeneous operating systems simultaneously run on platform 200. These operating systems may be implemented using the AIX® operating system, the i5/OS™ operating system or the Linux™ operating system, for example, which are designed to interface with server firmware. Operating systems 202, 204, 206, and 208 are located in partitions or virtual machines 203, 205, 207, and 209.

Additionally, these-partitions also include firmware loaders 211, 213, 215, and 217. Firmware loaders 211, 213, 215, and 217 may be implemented using IEEE-1275 Standard Open Firmware and runtime abstraction software (RTAS), which is available from International Business Machines Corporation. When partitions or virtual machines 203, 205, 207, and 209 are instantiated, a copy of the open firmware is loaded into each partition by the firmware's partition manager. The processors associated or assigned to the partitions are then dispatched to the partition's memory to execute the partition firmware.

Partitioned hardware 30 includes a plurality of processors 232-238, a plurality of system memory units 240- 46, a plurality of input/output WO) adapters 248-262, and a storage unit 270. Partitioned hardware 230 also includes service processor 290, which may be used to provide various services, such as processing of errors in the partitions. Each of the processors 232-238, memory units 240-246, NVRAM storage 298, and I/O adapters 248-262 may be assigned to one of multiple partitions within logical partitioned platform 200, each of which corresponds to one of operating systems 202, 204, 206, and 208.

Firmware 210 performs a number of functions and services for partitions or virtual machines 203, 205, 207, and 209 to create and enforce the partitioning of logical partitioned platform 200. Firmware 210 is a firmware implemented virtual machine identical to the underlying hardware. Hypervisor software is an example of server firmware available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and nonvolatile random access memory (nonvolatile RAM). Thus, firmware 210 allows the simultaneous execution of independent operating system images 202, 204, 206, and 208 by virtualizing hardware resources of logical partitioned platform 200. Virtualization is the pooling of information technology resources in a way that shields the physical nature and boundaries of those resources from users.

Operations of the different partitions may be controlled through a hardware management console, such as hardware management console 280. Hardware management console 280 is a separate data processing system from which a system administrator may perform various functions including reallocation of resources to different partitions. Alternatively, a Virtual Partition Manager is a feature of the i5/OS™ V5R3 operating system that allows one to create and manage one operating system logical partitions by initiating a console session using service tools.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system without departing from the spirit and scope of the present invention.

Figure 3:
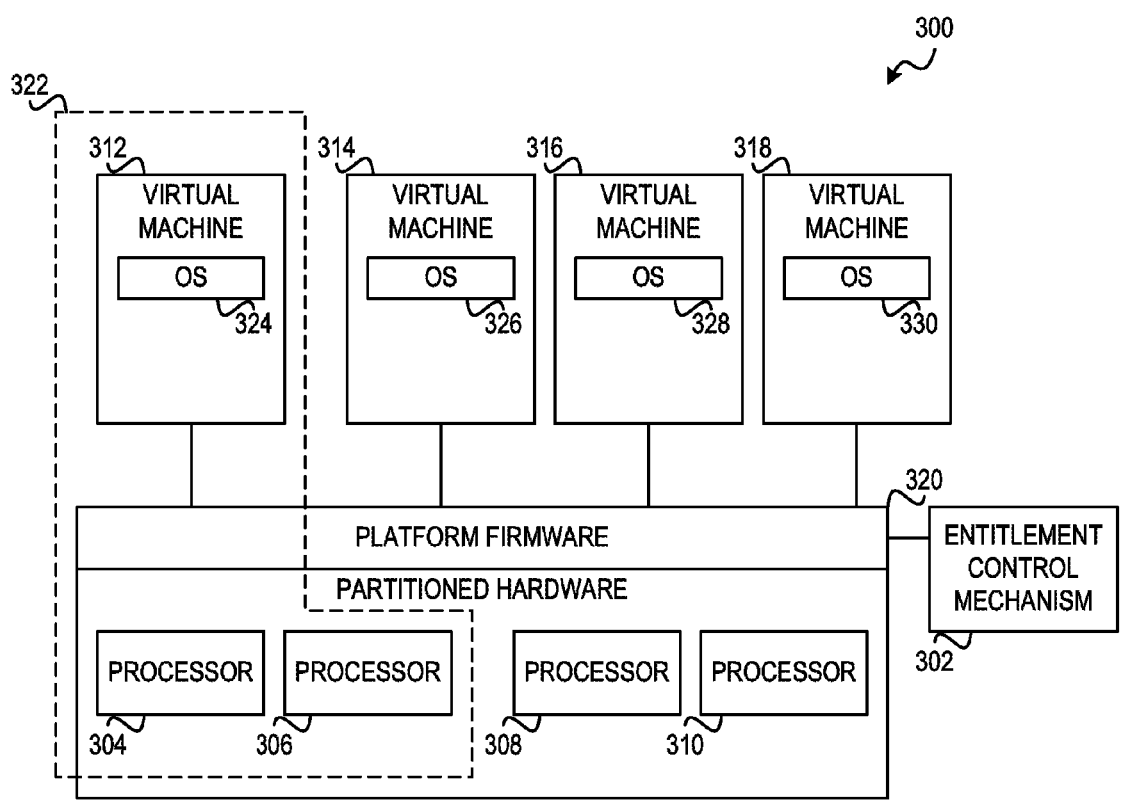
FIG. 3 depicts a mechanism for sharing resources allocated to an entitled virtual machine (VM) in accordance with an illustrative embodiment.

FIG. 3 depicts a mechanism for sharing resources allocated to an entitled virtual machine (VM) in accordance with an illustrative embodiment. Data processing system 300 comprises entitlement control mechanism 302, which manages time cycle allocations of processors 304-310 allocated to operating systems 324-330 of virtual machines 312-318. Entitlement control mechanism 302 may be logic that exists within platform firmware 320 or logic that is separate from platform firmware 320 working in conjunction with platform firmware 320. In accordance with the illustrative embodiments, entitlement control mechanism 302 creates a blocked domain 322 around entitled virtual machine 312 and processors 304 and 306 which are allocated to entitled virtual machine 312 by platform firmware 320. Operating system 324 within entitled virtual machine 312 operates in blocked domain 322 using a first dispatching algorithm to execute processes utilizing processors 304 and 306 as much as possible. To prevent other ones of operating systems 326-330 within VMs 314-316 from executing processes on processors 304 or 306, platform firmware 320 defends blocked domain 322 using the first dispatching algorithm by not dispatching processes from operating systems 326-330 within VMs 314-316 to processors 304-306 as indicated by the creation of blocked domain 322 by entitlement control mechanism 302.

However, entitlement control mechanism 302 monitors the utilization of processors 304-306 by entitled virtual machine 312. If entitlement control mechanism 302 determines that operating system 324 within entitled virtual machine 312 is underutilizing processors 304-306 below a predetermined threshold, entitlement control mechanism 302 sends a signal to platform firmware 320 indicating that platform firmware 320 should employ a second dispatching algorithm for use in dispatching processes from operating systems 326-330 within VMs 314-316 to processors 304-306. That is, as long as entitled virtual machine 312 is underutilizing processors 304-306, processor cycles from processors 304-306 may be utilized by one or more of operating systems 326-330 within VMs 314-316 to processors 304-306. Thus, the second algorithm is based on the entitlement of entitled virtual machine 312.

The predetermined threshold, which may be defined by an administrator of data processing system 300, is used to determine whether restrictions of blocked. domain 322 may be lifted. In accordance with the illustrative embodiments, the predetermined threshold allows entitled virtual machine 312 to hold onto a percentage of processors 304-306. For example, the predetermined threshold may be 50% utilization of processors 304-306. Thus, when execution of processes from operating system 324 dips below 50% utilization of processors 304-306, then entitlement control mechanism 302 may signal the employment of the second dispatch algorithm. However, if execution of processes from operating system 324 dips to, for example, 25% utilization of processors 304-306, entitlement control mechanism 302 prevents platform firmware 320 from allocating additional processes from operating systems 326-330 within VMs 314-316 to processors 304-306 based on the predetermined threshold. This preserves some processor cycles and cache content for entitled virtual machine 312 while lessening the burden of vacating processes from operating systems 326-330 within VMs 314-316 to processors 304-306 when processes from operating system 324 rises. That is, even though processes from operating system 324 has changed from 50% to 25%, the 25% of unutilized processing power from processors 304-306 is reserved for operating system 324 in entitled virtual machine 312 so that entitled virtual machine 312 may draw upon the unutilized resources without interrupting processes from operating systems 326-330. Thus, the predetermined threshold may be a percentage of an entitlement allocated to entitled virtual machine 312.

Therefore, when entitlement control mechanism 302 determines that the utilization of processors 304-306 by entitled virtual machine 312 falls below, for example, 50% of the entitlement (the predetermined threshold), utilizing the second algorithm provided by entitled virtual machine 312, platform firmware 320 lifts a portion of the restriction provided by block domain 322. That is, platform firmware 320 dispatches processes that have not been executed from operating systems 326-330 within VMs 314-316 to processors 304-306 up to the allowed percentage. Platform firmware 320 continues to dispatch processes from operating systems 326-330 within VMs 314-316 to processors 304-306, thereby operating in a semi-shared. mode, until entitlement control mechanism 302 determines that operating system 324 within entitled virtual machine 312 is once again utilizing or intending to utilize processors 304-306 to something above the predetermined threshold.

At this point, entitlement control mechanism 302 sends a signal to platform firmware 320 indicating that platform firmware 320 should employ either a third dispatching algorithm or a fourth dispatching algorithm for use in dispatching processes from operating systems 326-330 within VMs 314-316 to processors 304-306. By employing the third dispatching algorithm, platform firmware 320 executes a slow enforcement of blocked domain 322. That is, platform firmware 320 blocks the dispatch of any processes from operating systems 326-330 to processors 304-306. Thus, any processes from operating systems 326-330 that are currently executing on processors 304-306 are allowed to finish execution at which time operating system 324 within entitled virtual machine 312 will have all of processors 304-306 for executing its processes. However, if platform firmware 320 determines that a fast enforcement of blocked domain 322 needs to be executed, platform firmware 320 employs the fourth dispatching algorithm that not only blocks the dispatch of any processes from operating systems 326-330 to processors 304-306 but also interrupts current processes from operating systems 326-330 currently executing on processors 304-306. Additionally, since numerous processes may be executing on processors 304-306, platform firmware 320 may decide which processes are interrupted first based on a level of execution of the processes. That is, while the intent is to clear the execution of processes from operating systems 326-330 as fast as possible, platform firmware 320 may start the interruption based on the most recently executed processes thereby allowing the oldest processes time to finish execution prior to interrupt.

Thus, entitlement control mechanism 302 determines which of the third dispatching algorithm or the fourth dispatching algorithm to employ based on the rate of processes that are being issued by operating system 324. Further, even if entitlement control mechanism 302 initially indicates that platform firmware 320 should employ the third dispatching algorithm, if the rate of processes issued from operating system 324 rises past a predetermined threshold prior to processes from operating systems 326-330 finishing execution on processors 304-306, entitlement control mechanism 302 may send a change that platform firmware 320 should immediately employ the fourth dispatching algorithm.

By monitoring the rate at which processes from operating system 324 within entitled virtual machine 312 goes up, entitlement control mechanism 302 develops a feel for how suddenly additional processing power is needed. If the rise is gradual, then simply allowing processes from operating systems 326-330 within VMs 314-316 to processors 304-306 to run to the end of their time slice while blocking additional processes from operating systems 326-330 is enough. However, if the rise is sudden, the entitlement control mechanism 302 and platform firmware 320 may simply interrupt all processes from operating systems 326-330 within VMs 314-316 to processors 304-306. The threshold of when entitlement control mechanism 302 employs the third dispatching algorithm or the fourth dispatching algorithm may be set by a system administrator based on the performance sensitive nature of operating system 324 within entitled virtual machine 312.

The above aspects and advantages of the illustrative embodiments of the present invention will be described in greater detail hereafter with reference to the accompanying figures. It should be appreciated that the figures are only intended to be illustrative of exemplary embodiments of the present invention. The present invention may encompass aspects, embodiments, and modifications to the depicted exemplary embodiments not explicitly shown in the figures but would he readily apparent to those of ordinary skill in the art in view of the present description of the illustrative embodiments.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system," Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be a system, apparatus, or device of an electronic, magnetic, optical, electromagnetic, or semiconductor nature, any suitable combination of the foregoing, or equivalents thereof. More specific examples (a non-exhaustive list) of the computer readable storage medium would include the following: an electrical device having a storage capability, a portable computer diskette, a hard disk, a random access memory (RAM), a read-only memory (ROM), an erasable programmable read-only memory (EPROM or Flash memory), an optical fiber based device, a portable compact disc read-only memory (CDROM), an optical storage device, a magnetic storage device, or any suitable combination of the foregoing. In the context of this document, a computer readable storage medium may be any tangible medium that can contain or store a program for use by, or in connection with, an instruction execution system, apparatus, or device.

In some illustrative embodiments, the computer readable medium is a non-transitory computer readable medium. A non-transitory computer readable medium is any medium that is not a disembodied signal or propagation wave, i.e. pure signal or propagation wave per se. A non-transitory computer readable medium may utilize signals and propagation waves, but is not the signal or propagation wave itself. Thus, for example, various forms of memory devices, and other types of systems, devices, or apparatus, that utilize signals in any way, such as, for example, to maintain their state, may be considered to be non-transitory computer readable media within the scope of the present description.

A computer readable signal medium, on the other hand, may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Similarly, a computer readable storage medium is any computer readable medium that is not a computer readable signal medium.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 4A:
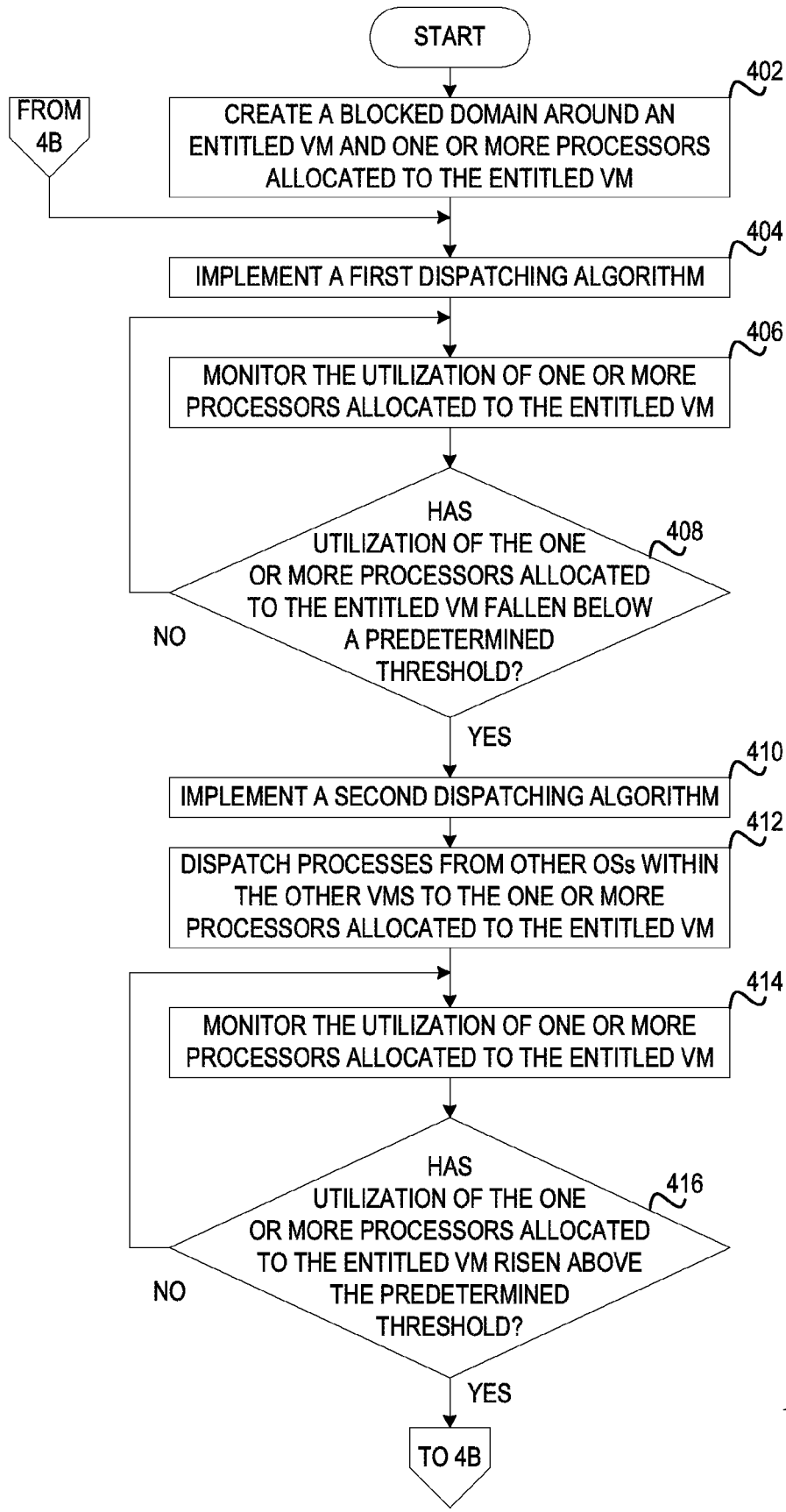
FIGS. 4A and 4B depict a flowchart of the operations performed in sharing resources allocated to an entitled virtual machine (VM) in accordance with an illustrative embodiment.
Figure 4B:
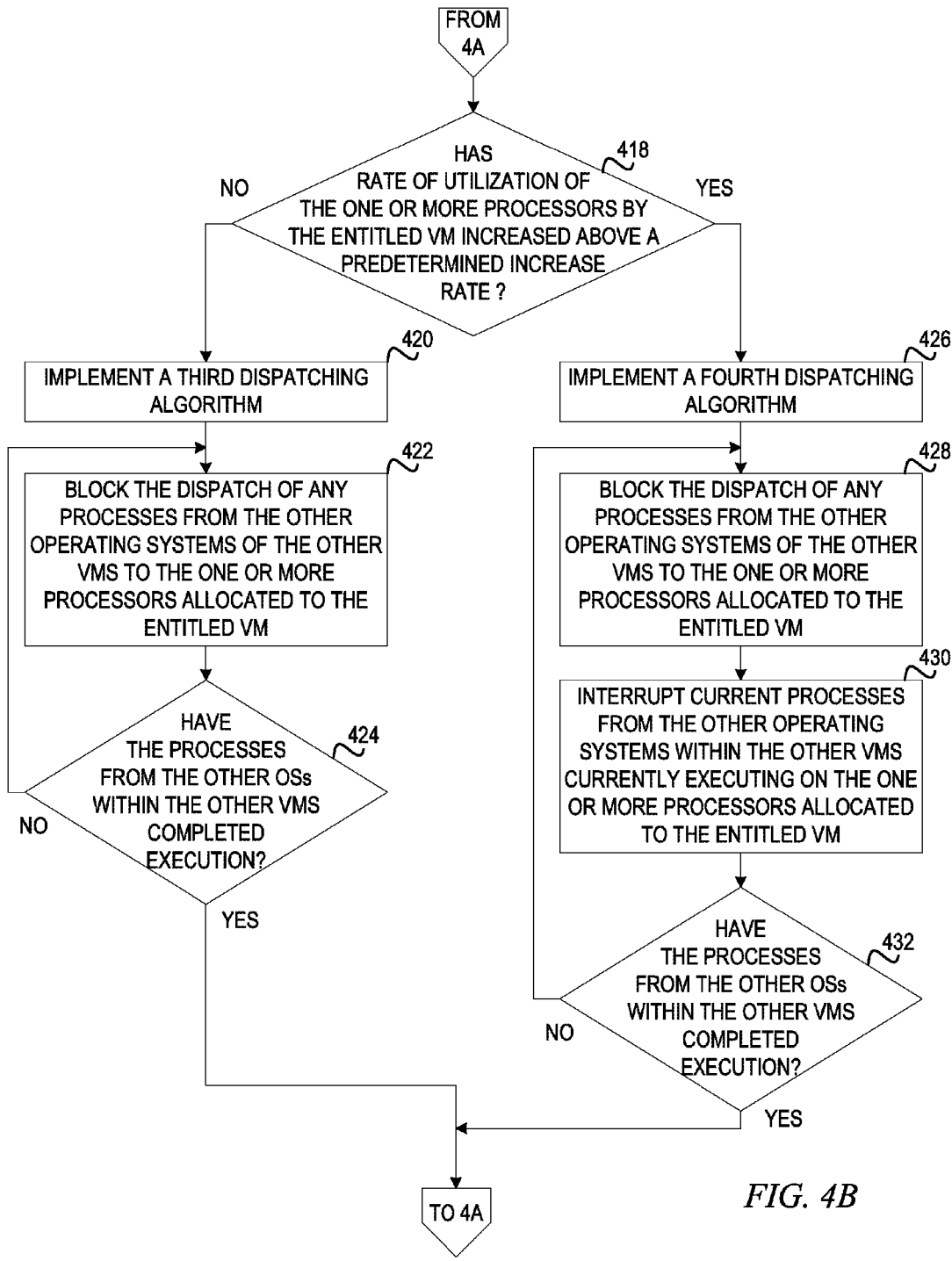

FIGS. 4A and 4B depict a flowchart of the operations performed in sharing resources allocated to an entitled virtual machine (VM) in accordance with an illustrative embodiment. As the operation begins, an entitlement control mechanism working in conjunction with platform firmware creates a blocked domain around an entitled virtual machine and one or more processors allocated to the entitled VM (step 402). Based on a signal from the entitlement control mechanism, platform firmware implements a first dispatching algorithm that prevents the dispatching of processes from other operating systems within other VMs to the one or more processors allocated to the entitled VM as indicated by the blocked domain step 404). The entitlement control mechanism then monitors the utilization of one or more processors allocated to the entitled virtual machine step 406). The entitlement control mechanism determines whether the utilization of the one or more processors allocated to the entitled virtual machine has fallen below a predetermined threshold (step 408).

If at step 408 the entitlement control mechanism determines that the utilization of the one or more processors allocated to the entitled virtual machine has not fallen below the predetermined threshold, then the operation returns to step 406. If at step 408 the entitlement control mechanism determines that the utilization of the one or more processors allocated to the entitled virtual machine has fallen below the predetermined threshold, then the entitlement control mechanism sends a signal to the platform firmware indicating the implementation of a second dispatching algorithm (step 410). The platform firmware then dispatches processes from other operating systems within the other VMs to the one or more processors allocated to the entitled VM up to the percentage of utilization indicated by the predetermined threshold (step 412). The entitlement control mechanism then monitors the utilization of one or more processors allocated to the entitled virtual machine (step 414).

The entitlement control mechanism determines whether the utilization of the one or more processors allocated to the entitled virtual machine by the entitled virtual machine has risen above the predetermined threshold (step 416). If at step 416 the entitlement control mechanism determines that the utilization of the one or more processors allocated to the entitled virtual machine by the entitled virtual machine has not risen above the predetermined threshold, then the operation returns to step 414. If at step 416 the entitlement control mechanism determines that the utilization of the one or more processors allocated to the entitled virtual machine by the entitled virtual machine has risen above the predetermined threshold, then the entitlement control mechanism determines whether the rate of utilization of the one or more processors by the entitled virtual machine is increasing above a predetermined increase rate(step 418).

If the entitlement control mechanism determines that the rate of utilization of the one or more processors by the entitled virtual machine is not increasing above the predetermined increase rate, then the entitlement control mechanism sends a signal to the platform firmware indicating an implementation of a third dispatching algorithm (step 420). By executing the third dispatching algorithm, the platform firmware blocks the dispatch of any processes from the other operating systems of the other VMs to the one or more processors allocated to the entitled VM (step 422). The entitlement control mechanism in conjunction with the platform firmware then determines whether all processes from the other operating system have completed execution on the one or more processors allocated to the entitled VM (step 424). If at step 424 not all of the processes have completed execution, the operation returns to step 422. If at step 424 all of the processes have completed execution, the operation returns to step 404. Thus, any processes from the other operating systems of the other VMs that are currently executing on the one or more processors allocated to the entitled VM are allowed to finish execution normally.

However, if at step 418 the entitlement control mechanism determines that the rate of utilization of the one or more processors by the entitled virtual machine is increasing above the predetermined increase rate, then the entitlement control mechanism sends a signal to the platform firmware indicating an implementation of a fourth dispatching algorithm (step 426). By executing the fourth dispatching algorithm, the platform firmware not only blocks the dispatch of any processes from the other operating systems of the other VMs to the one or more processors allocated to the entitled VM (step 428) but also interrupts current processes from the other operating systems within the other VMs currently executing on the one or more processors allocated to the entitled VM (step 430). The entitlement control mechanism in conjunction with the platform firmware then determines whether all processes from the other operating system have completed execution on the one or more processors allocated to the entitled VM (step 432). If at step 432 not all of the processes have completed execution, the operation returns to step 428. If at step 432 all of the processes have completed execution, the operation returns to step 404.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can he implemented by special purpose hardware-based systems that perform the specified functions or acts, or combinations of special purpose hardware and computer instructions.

Thus, the illustrative embodiments provide mechanisms for sharing resources allocated to an entitled virtual machine (VM). The mechanisms ensure that an entitled s optimized placement is preserved and the processor cycles are reserved for the entitled VM's use, while still making unused processor cycles available to uncapped VMs when the processor cycles are needed. By giving performance-sensitive VMs priority in a local processor pool of a shared VM environment (i.e., creating an entitled VM), processor cycles allocated to the entitled VM are made available to uncapped VMs under certain circumstances.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer program product comprising a non-transitory computer readable storage medium having a computer readable program stored therein, wherein the computer readable program, when executed on a computing device, causes the computing device to:
    create a blocked domain around an entitled virtual machine (VM) and one or more processors allocated to the entitled VM;
    implement a first dispatching algorithm that prevents the dispatching of processes from other operating systems within other VMs to the one or more processors allocated to the entitled VM;
    responsive to utilization of the one or more processors allocated to the entitled VM falling below a predetermined threshold, implement a second dispatching algorithm that allows dispatching of processes from the other operating systems within the other VMs to the one or more processors allocated to the entitled VM;
    after implementing the second dispatching algorithm, responsive to utilization of the one or more processors allocated to the entitled VM rising above the predetermined threshold, determine a rate of utilization increase of the one or more processors allocated to the entitled VM; and
    responsive to the rate of utilization of the one or more processors allocated to the entitled virtual machine increasing above a predetermined increase rate, implement a fourth dispatching algorithm that blocks dispatch of any additional processes from the other operating systems of the other VMs to the one or more processors allocated to the entitled VM and interrupts executing processes from the other operating systems of the other VMs.

2. The computer program product of claim 1, wherein the computer readable program further causes the computing device to:
    responsive to all of the executing processes from the other operating system of the other VMs completing execution, re-implement the first dispatching algorithm that prevents the dispatching of processes from the other operating systems within the other VMs to the one or more processors allocated to the entitled VM.

3. The computer program product of claim 1, wherein the executing processes from the other operating systems of the other VMs are interrupted based on a level of execution of the executing processes.

4. The computer program product of claim 1, wherein the executing processes from the other operating systems of the other VMs are interrupted all at one time.

5. An apparatus comprising:
    a processor; and
    a memory coupled to the processor, wherein the memory comprises instructions which, when executed by the processor, cause the processor to:
    create a blocked domain around an entitled virtual machine (VM) and one or more processors allocated to the entitled VM;
    implement a first dispatching algorithm that prevents the dispatching of processes from other operating systems within other VMs to the one or more processors allocated to the entitled VM;
    responsive to utilization of the one or more processors allocated to the entitled VM falling below a predetermined threshold, implement a second dispatching algorithm that allows dispatching of processes from the other operating systems within the other VMs to the one or more processors allocated to the entitled VM;

after implementing the second dispatching algorithm, responsive to utilization of the one or more processors allocated to the entitled VM rising above the predetermined threshold, determine a rate of utilization increase of the one or more processors allocated to the entitled VM; and responsive to the rate of utilization of the one or more processors allocated to the entitled virtual machine increasing above a predetermined increase rate, implement a fourth dispatching algorithm that blocks dispatch of any additional processes from the other operating systems of the other VMs to the one or more processors allocated to the entitled VM and interrupts executing processes from the other operating systems of the other VMs.

6. The apparatus of claim 5, wherein the instructions further cause the processor to:

responsive to all of the executing processes from the other operating system of the other VMs completing execution, re-implement the first dispatching algorithm that prevents the dispatching of processes from the other operating systems within the other VMs to the one or more processors allocated to the entitled VM.

7. The apparatus of claim 5, wherein the executing processes from the other operating systems of the other VMs are interrupted based on a level of execution of the executing processes.

8. The apparatus of claim 5, wherein the executing processes from the other operating systems of the other VMs are interrupted all at one time.

* * * * *